Figure 1:
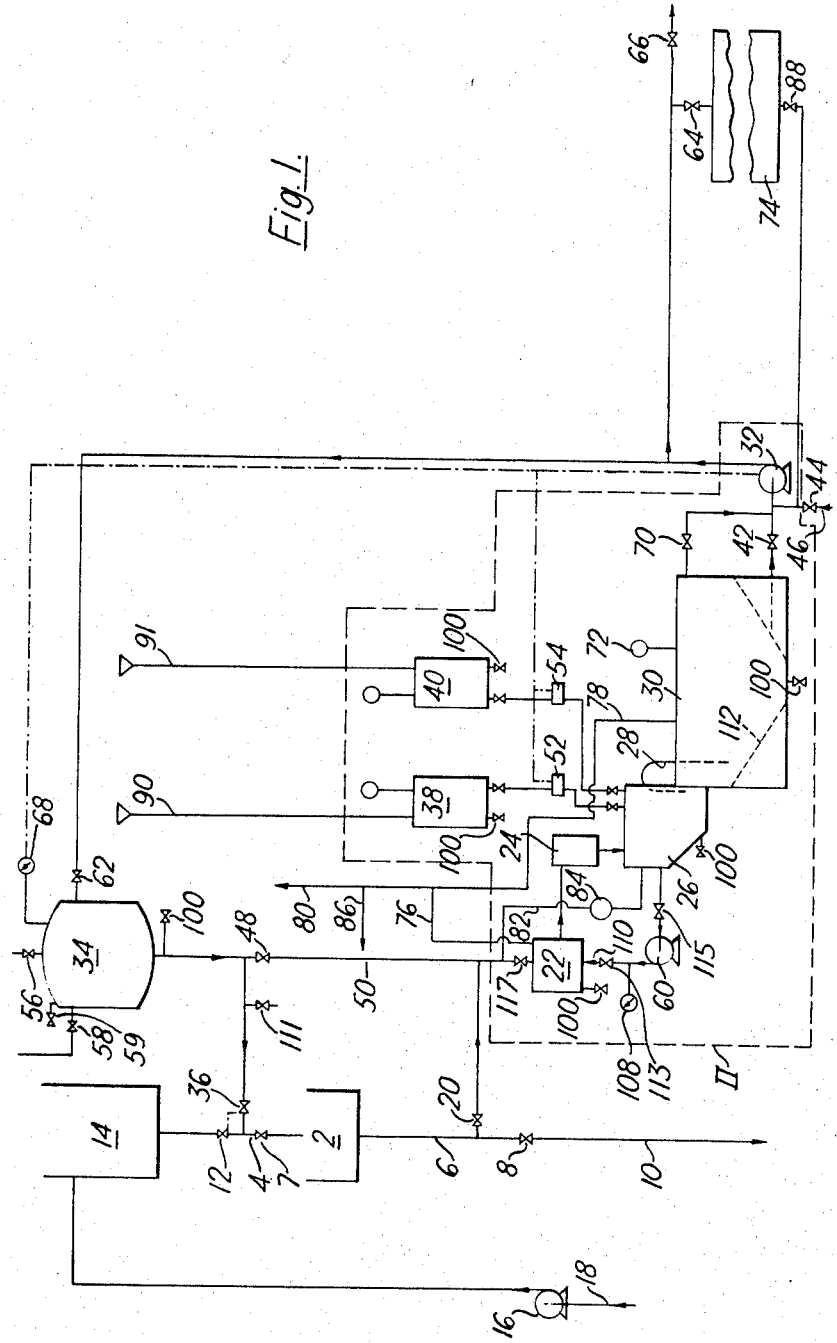

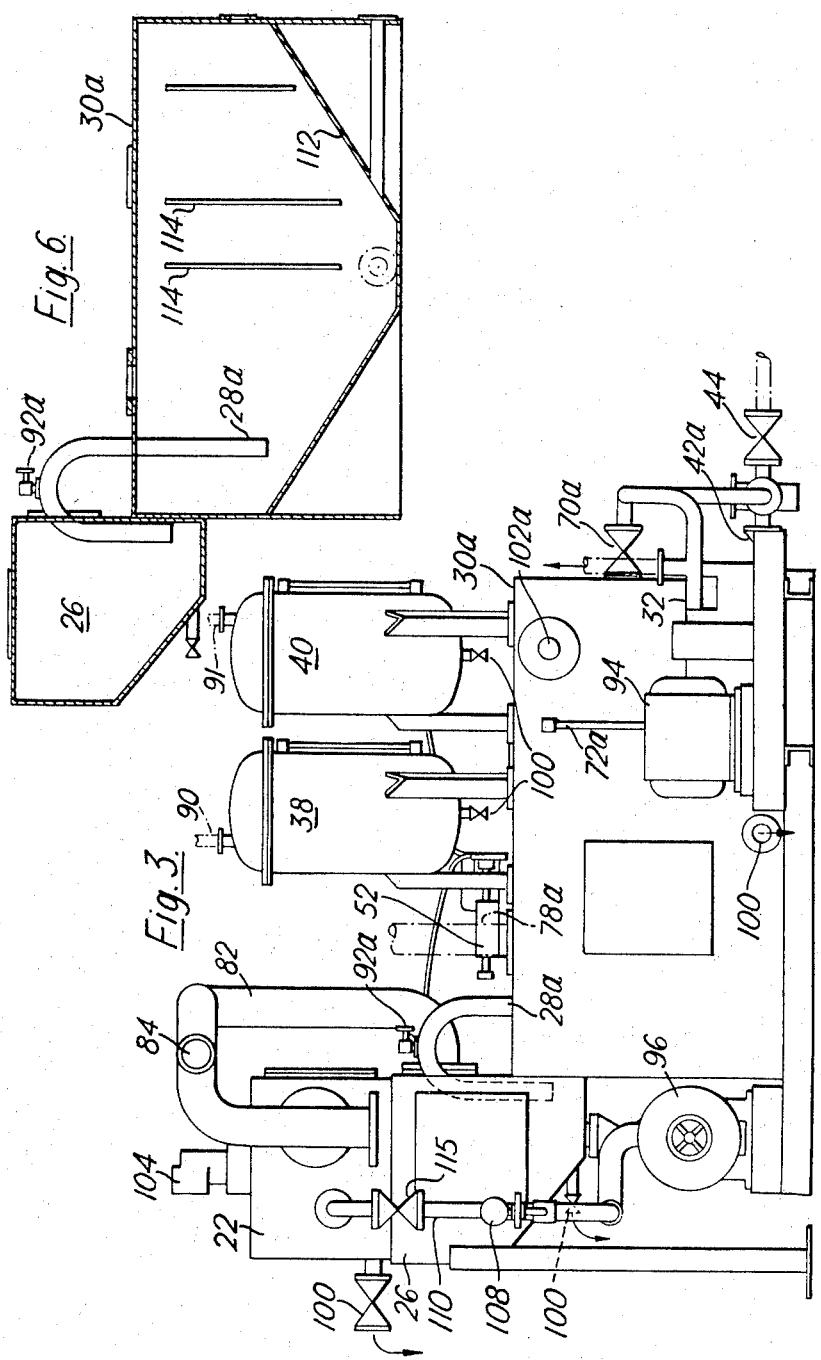

United States Patent Office 3,401,115
Patented Sept. 10, 1968

3,401,115
SEWAGE TREATMENT SYSTEM
Frederick William Albert Meyer, London, Charles Alexander Long, Upminster, Essex, and Victor Masters Lake, London, England, assignors to The Sanitas Company Limited, London, England, a British company
Filed Mar. 1, 1965, Ser. No. 435,903
Claims priority, application Great Britain, Mar. 2, 1964, 8,773/64
26 Claims. (Cl. 210—60)

This invention is concerned with methods and apparatus for sewage treatment which have been developed primarily for use in ships, for the purpose of avoiding the discharge of untreated sewage overboard in enclosed waters, but which may be used in other circumstances, especially where there are restrictions on disposal of effluent or on water supply, for example in mines, in deep air-raid shelters, or in hospitals for infectious diseases.

In methods of treating sewage according to the present invention, a solution of a caustic alkali in water is established in a treatment system which is connected to outlets of one or more receivers for sewage and to flushing inlets of the receivers, the concentration of caustic alkali being sufficient to make the solution germicidal; the solution is delivered from the system to the inlets as required, and the resultant solution plus sewage is thereupon received into the system; the caustic alkali reacts with, breaks down, and sterilizes the sewage, the concentration of the solution being maintained approximately constant by supplying additional caustic alkali into the system to replace that which reacts with the sewage, and the total quantity of liquid in the system being maintained approximately constant; and the breaking down of cellulose matter included in the sewage is accelerated by passing the solution plus sewage through a comminutor.

The word "receivers" is used as a generic term for water closets, urinals, and like equipment e.g. hospital slop sinks.

Numerous refinements are possible in this basic method, the need for refinement depending on the circumstances, in particular the number of receivers and their frequency of use, the amount of foreign matter placed in the receivers, whether there is need to reduce the bulk of the apparatus as much as possible, and what criteria are laid down by the users as to the appearance of the solution used for flushing.

Preferably the solution plus sewage is passed from the receiver outlets to the comminutor via a tank which is vented to atmosphere, so that the establishment of a continuous static column of solution extending from the receiver outlets to the comminutor is prevented.

Preferably suspended solids are separated from the solution prior to its being delivered to the flushing inlets. This may be carried out by a settling tank, by a filter, or otherwise.

Preferably some solution is drawn from downstream of the comminutor and is recirculated by being fed into the solution upstream of the comminutor.

The caustic alkali concentration requires to be maintained at a value sufficient to produce sterility, plus a margin to ensure continuous reliable operation, but should not be greatly above this value, both for the sake of economy and so that the solution is not noxious to users. The caustic alkali has the properties that, in such a concentration, in addition to being germicidal, it is miscible with urine, breaks down faecal matter rapidly and almost wholly dissolves it, and breaks down cellulose matter (which is the principal foreign matter present) and dissolves it, though somewhat more slowly. Caustic soda is the preferred alkali.

Preferably a bleaching agent is also introduced into and maintained in the solution. Sodium hypochlorite is the preferred bleaching agent.

Figure 2:
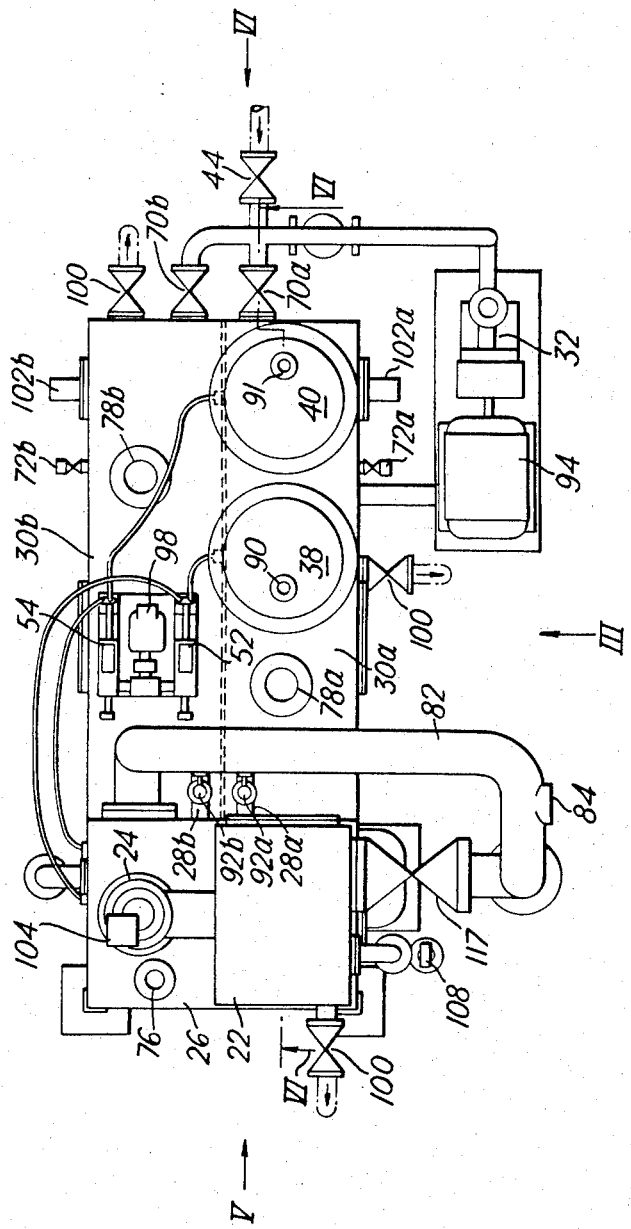
Figure 4:
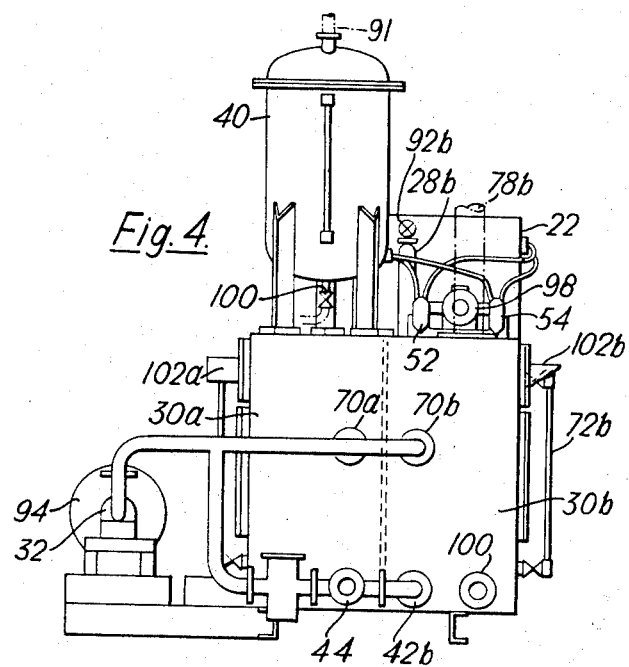
Figure 5:
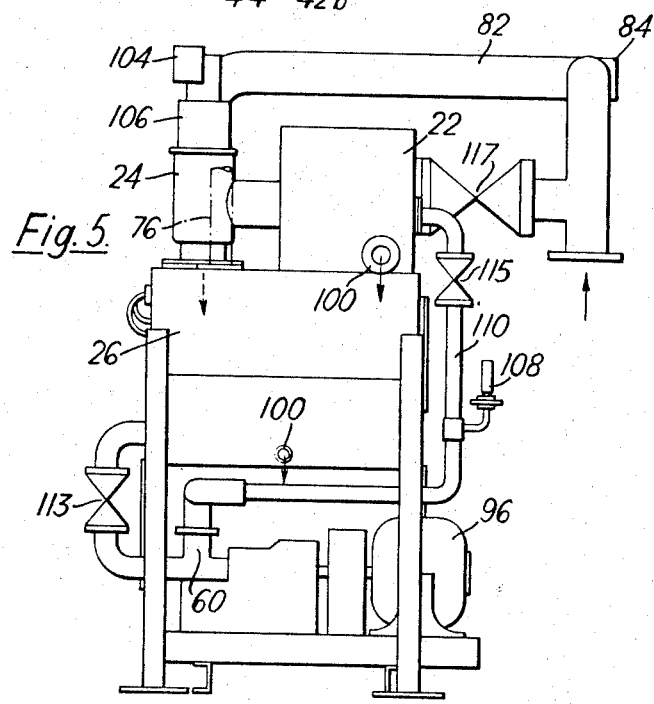

The accompanying drawings show one example of apparatus according to the present invention. In these drawings:

FIGURE 1 is a circuit diagram of the entire apparatus;
FIGURE 2 is a plan of that part of the apparatus lying within the dotted outline II in FIGURE 1;
FIGURE 3 is a side elevation seen in the direction of the arrow III in FIGURE 2;
FIGURES 4 and 5 are end elevations seen in the direction of the arrows IV, V respectively in FIGURE 2, components at the more remote end being omitted in each case; and
FIGURE 6 is a longitudinal section of part of the apparatus, on the line VI—VI in FIGURE 2.

The general layout of the apparatus will first be described with reference to FIGURE 1. The apparatus is installed in a ship. In various parts of the ship, depending on the arrangement of the accommodation, there are water closets and urinals, indicated generically at 2. These receive liquid for flushing through a pipe 4, and are drained through a pipe 6. The branches to the individual water closets and urinals, and the various individual valves 7 to control flushing are not shown, for the sake of simplicity. In the rest of this description, the generic expression "the receivers" will be used in reference to the water closets and urinals.

When the ship is in open waters, where the discharge of crude sewage overboard is permissible, the pipe 6 is connected through a valve to an overboard discharge 10. At the same time, the pipe 4 is connected through a valve 12 to a tank 14 which is kept charged with salt water by a pump 16 having its inlet 18 connected to the sea.

In enclosed waters, the valves 12 and 8 are shut, and the receivers become part of a continuous path extending from the pipe 6 through a valve 20 to a breakdown tank 22, thence through a comminutor 24 into an intermediate tank 26, and from the intermediate tank through a syphon 28 into a settling tank 30 (as described below, there are in fact two settling tanks operated in an alternate manner). The path continues from the settling tank 30 through a pump 32 to a pressurised storage tank 34, and thence through a valve 36 to the pipe 4 leading to the inlets of the receivers. The valves 12 and 36 are interlocked so that the valve 12 cannot be opened until the valve 36 is fully closed and vice versa.

A supply of caustic soda is maintained in a tank 38, and a supply of sodium hypochlorite is maintained in a tank 40. Before the ship enters enclosed waters, a valve 42 at the outlet from the bottom of the settling tank is closed, and a valve 44 is open to connect the inlet of the pump 32 to the sea at 46. At the same time, while the valves 36 and 20 are still closed, a bypass valve 48 is opened, thus putting the pressurised tank 34 into communication with the breakdown tank 22 via a pipe 50. The pump 32 is then operated, so as to fill the tanks 26 and 30 with seawater nearly to their tops. Then the valve 44 is closed and a valve 70 is opened in a pipe connected to the settling tank near its top, while the pump 32 continues to operate, so that seawater is circulated around the continuous path, bypassing the receivers 2, which are still connected to the tank 14 and the outlet 10. At the same time, pumps 52 and 54 operate so as to introduce caustic soda and sodium hypochlorite into the intermediate tank 26, and this continues until the continuous path contains a solution having a strength of about 1% of caustic soda. The pumps 32, 52 and 54 are then stopped. To complete the preparation of the apparatus for use in enclosed waters, after closing the valve 48 the pressure of air trapped in the upper part of the storage tank 34 is adjusted to a suitable value by either releasing air through a vent valve 56, or admitting compressed air through a valve 58. The tank 34 has a safety valve 59.

The apparatus is then put into use in enclosed waters by closing the valves 12 and 8, and opening the valves 36 and 20. Every time one of the receivers is flushed, a quantity of solution passes out of the storage tank 34 into the pipe 4, and a corresponding quantity of solution plus sewage enters the pipe 6, and passes into the breakdown tank 22. The solution is itself sterile, and the caustic soda has a germicidal action which renders the sewage sterile. The caustic soda reacts with an breaks down the sewage so ensuring that the sterilising action affects all the sewage. In addition, the caustic soda converts the faecal matter to liquid form. The breaking down of cellulose matter included in the sewage is slower, and is accelerated by the passing of the solution plus sewage through the comminutor 24. This comminutor consists of a slotted drum rotated by a small electric motor. The solution flows radially inwards through the slots, and then axially out of the lower end of the drum. Smaller solid particles pass through hte slots and larger pieces are retained on the outside of the drum until they are restrained by fixed combs. The drum carries cutting teeth which pass through the fixed combs, and in so doing cut the large pieces of solids into small pieces, which then pass through the slots. This is a known type of comminutor, and the internal construction will not be illustrated in detail, as it is not part of the present invention.

To assist the action of the comminutor, solution is continuously drawn from the bottom of the intermediate tank 26 by a pump 60 and recirculated into the breakdown tank 22. This recirculation is at a considerably higher rate than the rate of inflow of solution plus sewage from the pipe 6 into the breakdown tank 22. The effect of the inflow of sewage is that the level of solution in the intermediate tank 26 gradually rises until it reaches the top of the syphon 28. Thereupon a quantity of solution passes over through the syphon into the settling tank 30. The intermediate tank 26 then gradually refills again until a further transfer of solution into the settling tank 30 occurs and so on. This transference at intervals ensures that the flow during transfer is rapid, and therefore solid material which has not yet been fully broken down by the caustic soda is carried over into the settling tank 30.

In the settling tank, the action of breaking down of solid material is carried to conclusion, and only a very small residue of solid remains. Most of this residue gradually settles to the bottom of the settling tank, and can be removed at long intervals by means of the pump 32, by opening the valve 42, closing a valve 62 in the pipe leading to the pressurised tank 34, and opening either a valve 64 leading to a storage tank elsewhere in the ship, or a valve 66 used either to permit discharge overboard at a time when the ship is in the open sea, or alternatively to permit discharge to a shore installation.

As solution is being intermittently drawn from the pressurised tank 34 for flushing purposes, it is necessary from time to time to supply more solution to this tank. This is done by operating the pump 32 at intervals in response to the pressure in the air space in the tank 34 as measured by an indicator 68. When the pressure falls below a predetermined value, the pump 32 is operated until the pressure attains a predetermined higher value, and the pump is then stopped. Throughout this time, the valves 42, 64 and 66 are closed, and the withdrawal of solution from the settling tank takes place through the valve 70 in the pipe connected to the settling tank near its top. The valve 62 is also kept open.

Whenever the pump 32 is operated, the pumps 52 and 54 are also operated in order to introduce additional caustic soda and sodium hypochlorite into the intermediate tank 26. By this means the concentration of the solution is maintained at a nearly constant value, because the demand on the pump 32 depends directly on the amount of solution called for for flushing the receivers, which is an approximate indication of the amount of raw sewage, in the treatment of which the caustic soda and sodium hypochlorite in the solution will be depleted.

Because of the intermittent operation of the pump 32 and of the syphon 28, the level of the free surface of the solution in the settling tank 30 will fluctuate somewhat, but the mean level will tend to rise owing to the liquid content of the raw sewage being introduced into the apparatus. The mean level is observed by a level indicator 72 and from time to time solution is withdrawn from the settling tank 30 by the pump 32 and directed to the ship's tanks 74 or to a shore installation, in order to maintain an approximately constant quantity of solution circulating. It may also be permissible to discharge this surplus solution overboard even while the ship is in enclosed waters, provided that the surplus solution is diluted, e.g. with waste water from baths, so that it has no appreciable biological oxygen demand.

The pressure over the free surface of the solution in the tanks 22, 26 and 30 is prevented from rising substantially above atmospheric by connecting the tanks 22 and 30 by pipes 76 and 78 to a vent 80. This vent provides an escape for gas generated by the action of the sodium hypochlorite, and also for some evaporation of the solution, especially if the apparatus is located in the ship's engine room where the temperature is high.

If the solids content of the raw sewage should tend to build up on the comminutor drum, so that the flow of solution through the comminutor is less than the total of the incoming flow plus the recirculation, then the tank 22 will fill completely, and, in order to prevent a column of solution building up in the pipe 6, a bypass pipe 82 is provided, through which the excess solution may go direct to the intermediate tank 26. The fact that this is occurring is revealed through a sight glass 84. This bypass 82 is connected into the inlet of the tank 22 at a level lower than the point of junction of the vent pipes 76 and 78 so that solution will not normally find its way up the pipe 76 and then down the pipe 78. If, however, owing to some unusual blockage, solution should start rising above the level of the upper end of the bypass 82, any possibility of flooding of the receivers is prevented by provision of a branch 86 leading from the vent 80 to an overboard discharge at a level somewhat below the lowest of the receivers.

If excess solution has been pumped into the ship's tanks 74 while the ship is in enclosed waters, then when the ship reaches the open sea, the tanks may be emptied by connecting the bottom of the tanks through a valve 88 to the inlet of the pump 32, the outlet of the pump being connected through the valve 66 to the overboard discharge, the valves 42, 70, 64 and 62 being maintained closed.

The tanks 38 and 40 are refilled from time to time with concentrated caustic soda and sodium hypochlorite respectively through pipes 90 and 91 which lead to inlets at deck level. These pipes also provide ventilation for the tanks 38 and 40.

In order to ensure optimum breaking down of solids, in particular the more resistant cellulose matter, especially if the appearance of the flushing liquid is regarded as important, which would be the case in a passenger ship, it is desirable to ensure that substantially all the solution passing through the settling tank takes several hours to do so. While a system of baffles within the tank may assist attainment of this result, it is preferred to ensure the result by providing two settling tanks, the functions of which are exchanged repeatedly. That is to say for a period of some hours one settling tank is used to supply the solution to the pressurized tank 34, while the other settling tank is used to receive solution from the intermediate tank 26, and then appropriate connections are opened and closed so that the second tank supplies solution to the pressurized tank 34, while the first tank receives the solution from the intermediate tank 26, and so on alternately.

FIGURES 2 to 6 show the physical construction of those components of the apparatus which lie within the dotted outline II in FIGURE 1. In the lower part there are two settling tanks 30a and 30b side by side. The intermediate tank 26 is at the left hand end, and on top of it are the breakdown tank 22 and the comminutor 24. Other components are given the same reference numerals as in FIGURE 1.

The alternate operation of the settling tanks 30a and 30b is controlled by alternate operation of valves 70a and 70b, and also by alternately venting the tops of the syphons 28a and 28b to atmosphere through vent valves 92a and 92b.

The pumps 32 and 60 are operated by electric motors 94 and 96 respectively. The pumps 52 and 54 are operated by a common motor 98. The connections from these pumps are by flexible piping. The pumps 32 and 60 are of the type in which a helical rotor operates within a housing having a double internal helix, while the pumps 52 and 54 are of ram or diaphragm type. Thus all the pumps have a positive displacement action. All the various tanks are provided with drain valves 100 to permit the apparatus to be cleaned out from time to time.

The level indicator for each settling tank is in the form of a gauge glass 72a and 72b. In addition alarm devices 102a, 102b are provided to draw attention to excessively high levels.

The comminutor 24 is driven by a small electric motor 104 and reduction gear 106. Any tendency for solution to build up at the inlet to the comminutor is indicated by a pressure gauge 108 connected in the pipe 110 through which recirculating solution is delivered by the pump 60 into the breakdown tank 22. The pipe 110 includes shut-off valves 113, 115, and the inlet to the breakdown tank 22 can be closed by a valve 117.

In each settling tank, as shown in FIGURE 6, the bottom is formed with sloping ends 112, and there are baffles 114 which interfere with any tendency for solution to flow too directly from the syphon to the outlet at the right hand end of the tank, and which also resist surging if the settling tanks should be in use while the ship is manoeuvring in rough sea.

The particular apparatus shown is intended to handle an input of solution plus sewage at a rate of about 43 gallons per hour. The rate of recirculation of solution by the pump 60 is 21 gallons per minute. The volume of the breakdown tank 22 is 4½ cubic feet; the volume of the intermediate tank 26 is 10 cubic feet; and the volume of each of the settling tanks 30a, 30b is 17 cubic feet. The exchange of functions of the two settling tanks occurs once every 24 hours. The solid content of the input of solution plus sewage is about 5 percent. The solids settling from the solution in the settling tanks amount to only about 40 parts per million. Once a day a sample of solution is drawn off at 111 (FIGURE 1), and the concentration of a caustic soda is checked by titration. If the concentration is tending to rise or fall, the pump 52 is cut off for a period or operated additionally, as the case may be. A concentration of ½% caustic soda in the solution is sufficient, but to provide a margin for fluctuation between tests it is preferable to aim to maintain a concentration of 1% caustic soda. The concentration of sodium hypochlorite does not need to be checked.

Although it is convenient to construct the apparatus in the form of a succession of tanks connected by pipes, this is not essential to the method according to the invention, and the path along which the solution is passed may be more in the nature of a continuous duct.

We claim:

1. A method of treating sewage, comprising establishing a solution of a caustic alkali in water in a treatment system which is connected to outlets of one or more receivers for sewage and to flushing inlets of the receivers, the concentration of caustic alkali being sufficient to make the solution germicidal; delivering the solution from the system to the inlets as required, and thereupon receiving the resultant solution plus sewage into the system, whereupon the caustic alkali reacts with, breaks down, and sterilizes the sewage; maintaining the concentration of the solution approximately constant by supplying additional caustic alkali into the system to replace that which reacts with the sewage; maintaining the total quantity of liquid in the system approximately constant; and accelerating the breaking down of cellulose matter included in the sewage by passing the solution plus sewage through a comminutor.

2. A method according to claim 1, including drawing a stream of solution from downstream of the comminutor and recirculating that stream by feeding it into the solution upstream of the comminutor.

3. A method according to claim 1, including passing the solution plus sewage from the receiver outlets to the comminutor via a tank which is vented to atmosphere, so that the establishment of a continuous static column of solution extending from the receiver outlets to the comminutor is prevented.

4. A method according to claim 1 in which the caustic alkali is caustic soda.

5. A method according to claim 1, including separating suspended solids from the solution prior to delivering the solution to the flushing inlets.

6. A method according to claim 5, including delivering solution from the comminutor into a settling tank, and supplying solution to the receiver inlets from the upper part of the settling tank.

7. A method according to claim 6, including withdrawing quantities of liquid from the system as necessary to maintain the level of liquid in the settling tank within a predetermined range.

8. A method according to claim 7, applied on board a ship while in enclosed waters, including the step of holding the liquid withdrawn in a storage tank within the ship, and discharging that liquid only after the ship has reached the open sea.

9. A method according to claim 6 including pasing solution from the comminutor to the settling tank via an intermediate tank, and drawing a stream of solution from the intermediate tank and recirculating that stream by feeding it into the solution upstream of the comminutor.

10. A method according to claim 9, including using two settling tanks, one to receive solution from the comminutor and the other to supply solution to the receiver inlets, and exchanging the functions of the two settling tanks repeatedly.

11. A method according to claim 1, including feeding solution in measured quantities to a tank, and supplying solution from that tank to the receiver inlets for flushing as required, and, on each occasion that solution is fed to that supply tank, supplying a proportional quantity of caustic alkali into the system.

12. A method according to claim 11, including on each occasion that solution is fed to the supply tank, supplying a proportional quantity of a bleaching agent into the system.

13. A method according to claim 1 including also introducing and maintaining a bleaching agent in the solution.

14. A method according to claim 13, in which the bleaching agent is sodium hypochlorite.

15. Apparatus for treating sewage, comprising one or more receivers for sewage, each with an inlet for flushing solution and an outlet for solution plus sewage, a system providing a continuous path from the outlets to the inlets, means for pumping solution along that path, a comminutor in the path, and a tank in the path between the receiver outlets and the comminutor, the tank being vented to atmosphere at a point at a lower level than the receiver outlets.

16. Apparatus according to claim 15, including means for separating suspended solids from the solution, between the comminutor and the receiver inlets.

17. Apparatus according to claim 15, including means for drawing solution from the path downstream of the comminutor and feeding it into the path upstream of the comminutor.

18. Apparatus according to claim 15, including a passage permitting solution to pass from the top of the tank to the path downstream of the comminutor when the tank is full.

19. Apparatus according to claim 16, including a settling tank, a connection for delivering solution to the settling tank from the comminutor, and a connection for drawing solution from the upper part of the settling tank for delivery to the receiver inlets.

20. Apparatus according to claim 19, including means arranged to withdraw liquid from the settling tank to maintain the liquid level in the settling tank within a predetermined range.

21. Apparatus according to claim 20, installed in a ship, including a tank within the ship to receive the withdrawn liquid.

22. Apparatus according to claim 18, in which the connection to the settling tank from the comminutor is via an intermediate tank, and there is means for drawing solution from the intermediate tank and feeding it into the path upstream of the comminutor.

23. Apparatus according to claim 22, including two settling tanks, each with a connection to the intermediate tank which can be interrupted and with a connection to the receiver inlets which can be interrupted.

24. Apparatus according to claim 15, in which the path includes a further tank, which is connected to supply solution to the receiver inlets for flushing as required, means in the path for feeding solution to that tank in measured quantities, and means for feeding a liquid chemical into the system in quantities proportional to the quantities of solution fed to that tank.

25. Apparatus according to claim 24, also including means for feeding a second liquid chemical into the system in quantities proportional to the quantities of solution fed to that tank.

26. An assembly of a comminutor, a first tank connected to the inlet of the comminutor, an intermediate tank connected to the outlet of the comminutor, a settling tank connected to the intermediate tank, and a pump arranged to recirculate solution from the intermediate tank to the first tank.

References Cited

UNITED STATES PATENTS

| | | | |
|---|---|---|---|
| 2,709,680 | 5/1955 | Watson | 210—152 X |
| 2,858,939 | 11/1958 | Corliss | 210—152 X |

MICHAEL E. ROGERS, *Primary Examiner*.